(12) United States Patent
Ranasinghe et al.

(10) Patent No.: US 6,446,440 B1
(45) Date of Patent: Sep. 10, 2002

(54) STEAM INJECTION AND INLET FOGGING IN A GAS TURBINE POWER CYCLE AND RELATED METHOD

(75) Inventors: Jatila Ranasinghe, Niskayuna; Charles Michael Jones; Robert Russell Priestley, both of Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/662,779

(22) Filed: Sep. 15, 2000

(51) Int. Cl.$^7$ ................................................. F02C 3/30
(52) U.S. Cl. ............................ 60/775; 60/39.53
(58) Field of Search ..................... 60/39.53, 39.54, 60/39.55, 39.56, 39.58, 39.59, 728, 775

(56) References Cited

U.S. PATENT DOCUMENTS

| | | | |
|---|---|---|---|
| 2,863,282 A | 12/1958 | Torell | |
| 3,353,360 A | * 11/1967 | Gorzegno | ................ 60/39.182 |
| 3,693,347 A | 9/1972 | Kydd et al. | |
| 3,747,336 A | 7/1973 | Dibelius et al. | |
| 3,785,146 A | 1/1974 | Bailey et al. | |
| 3,788,066 A | * 1/1974 | Nebgen | ........................ 60/775 |
| 4,259,837 A | 4/1981 | Russell et al. | |
| 4,785,622 A | 11/1988 | Plumley et al. | |
| 4,928,478 A | 5/1990 | Maslak | |
| 5,906,095 A | * 5/1999 | Frutschi et al. | ............. 60/39.53 |

* cited by examiner

Primary Examiner—Louis J. Casaregola
(74) Attorney, Agent, or Firm—Nixon & Vanderhye P.C.

(57) ABSTRACT

A steam injection and inlet fogging system is provided for a gas turbine power plant that includes a gas turbine having a compressor, a combustor and a turbine for driving a generator. A waste heat recovery unit is arranged to receive exhaust gas from the turbine, the former having a plurality of heat exchange sections for heating water with the exhaust gas. A flash tank is arranged to receive heated water from the waste heat recovery unit for producing steam. A first stream of makeup water from a first of the plurality of heat exchange sections is flashed to the flash tank to also produce saturated steam and water at a first location in the flash tank. A second stream of water from a second of the plurality of heat exchange sections is also flashed to the flash tank to produce saturated steam and water at a second location in the flash tank. A portion of the saturated steam produced in the flash tank is supplied to the gas turbine combustor, and a remaining portion of the saturated steam is supplied to the compressor via an inlet fogger. The system also controls contaminants in the water produced in the flash tank.

18 Claims, 1 Drawing Sheet

STEAM INJECTION AND INLET FOGGING IN A GAS TURBINE POWER CYCLE AND RELATED METHOD

BACKGROUND OF THE INVENTION

This invention relates to turbo machinery power cycles, and, more particularly, to turbine inlet fogging and turbine combustor steam injection.

It is known that water or steam may be injected into a gas turbine at various points within a cycle to increase the mass flow of motive fluid to augment gas turbine power, and/or to control NOx emissions. Specifically, steam injection into the combustor, and compressor air inlet fogging both produce increased output, and improved heat rate when gas turbine exhaust energy is used for steam generation. Current state of the art systems for steam injection and inlet fogging, however, require a demineralized water treatment facility to produce steam suitable for introduction into the gas turbine.

BRIEF SUMMARY OF THE INVENTION

The present invention provides a cycle design method for gas turbine power plants that includes both steam injection and inlet fogging. The system design described in this disclosure is unique in that it does not require a demineralized water treatment facility that is typically required for current state of the art systems. Rather, steam is produced in this system by flashing high pressure hot water streams to a flash tank/dearator (or simply, flash tank) operating at reduced pressure, while the water quality in the tank is controlled with blowdown. Specifically, makeup water is heated using gas turbine exhaust energy in a waste heat recovery unit and then flashed via a first stream to the flash tank operating at a lower pressure, which results in the production of saturated steam and water. Saturator bottoms water from the flash tank is pumped to a higher pressure, and then heated in the waste heat recovery unit using the exhaust energy from the gas turbine. The saturator bottoms water leaving the waste heat recovery unit is then flashed via a second stream to the flash tank, also resulting in the production of saturated steam and water. The liquid remaining after flashing the first stream, is dearated with the steam produced by flashing the second stream in the flash tank. The resultant bottoms water stream draining from the tank is thus dearated, allowing for economic material selection for the system.

A small portion of the steam produced in the flash tank is condensed in a heat exchanger (in heat exchange with the makeup water stream), and the resulting water is of acceptable quality (dissolved solids and salts acceptable) for inlet fogging. The remaining steam produced in the flash tank is heated in the waste heat recovery unit and is subsequently injected into the gas turbine combustor.

The makeup water for this system may be potable water with minimal water treatment, i.e., no demineralization is required. This is possible due to the use of the flash tank/dearator for steam production, and the control of contaminants concentration in the flash tank.

Accordingly, in one aspect, the invention relates to a gas turbine power plant that includes a compressor, a combustor and a turbine, and that also includes compressor inlet fogging and combustor steam injection. The invention specifically relates to an arrangement for supplying water for inlet fogging and steam injection without demineralization treatment comprising a flash tank arranged to receive heated potable water and to separate the heated potable water into saturated steam and water; a blowdown stream for controlling contaminants in the water within the flash tank; one or more conduits arranged to supply a first portion of the saturated steam in the flash tank to the combustor; one or more conduits arranged to supply a second portion of the saturated steam to a heat exchanger where the saturated steam is condensed; and one or more conduits for supplying condensed saturated steam to an inlet fogger in fluid communication with the compressor.

In another aspect, the invention relates to a steam injection and inlet fogging system for a gas turbine power plant comprising a gas turbine having a compressor, a combustor and a turbine for driving a generator; a waste heat recovery unit arranged to receive exhaust gas from the turbine, the waste heat recovery unit having a plurality of heat exchange sections for heating water with the exhaust gas; a flash tank for producing steam arranged to receive heated water from the waste heat recovery unit; means for flashing a first stream of water from a first of the plurality of heat exchange sections to the flash tank to thereby produce saturated steam and water at a first location in the flash tank; means for flashing a second stream of water from a second of the plurality of heat exchange sections to the flash tank to thereby produce saturated steam and water at a second location in the flash tank; means for supplying a portion of the saturated steam produced in the flash tank to the gas turbine combustor; means for supplying a remaining portion of the saturated steam to the compressor via an inlet fogger; and means for controlling contaminants in the water produced in the flash tank.

In still another aspect, the invention relates to a method of providing steam for a steam injection and inlet fogging system for a gas turbine power plant that includes a gas turbine having a compressor, a combustor and a turbine for driving a generator, and without having to provide a demineralization treatment for water used to generate the steam comprising:

a) supplying a heated makeup water in a first stream to a flash tank for producing saturated steam and water;

b) draining water from the flash tank while removing contaminants therefrom and, after heating, recirculating a portion of the drained water to the flash tank in a second stream;

c) removing saturated steam from the flash tank/dearator and supplying a portion of the saturated steam to the combustor and another portion of the saturated steam to the compressor via an inlet fogger.

BRIEF DESCRIPTION OF THE DRAWINGS

This single FIGURE is a flow diagram illustrating a steam injection and inlet fogging system in accordance with an exemplary embodiment of the invention.

DETAILED DESCRIPTION OF THE INVENTION

Figure 1:
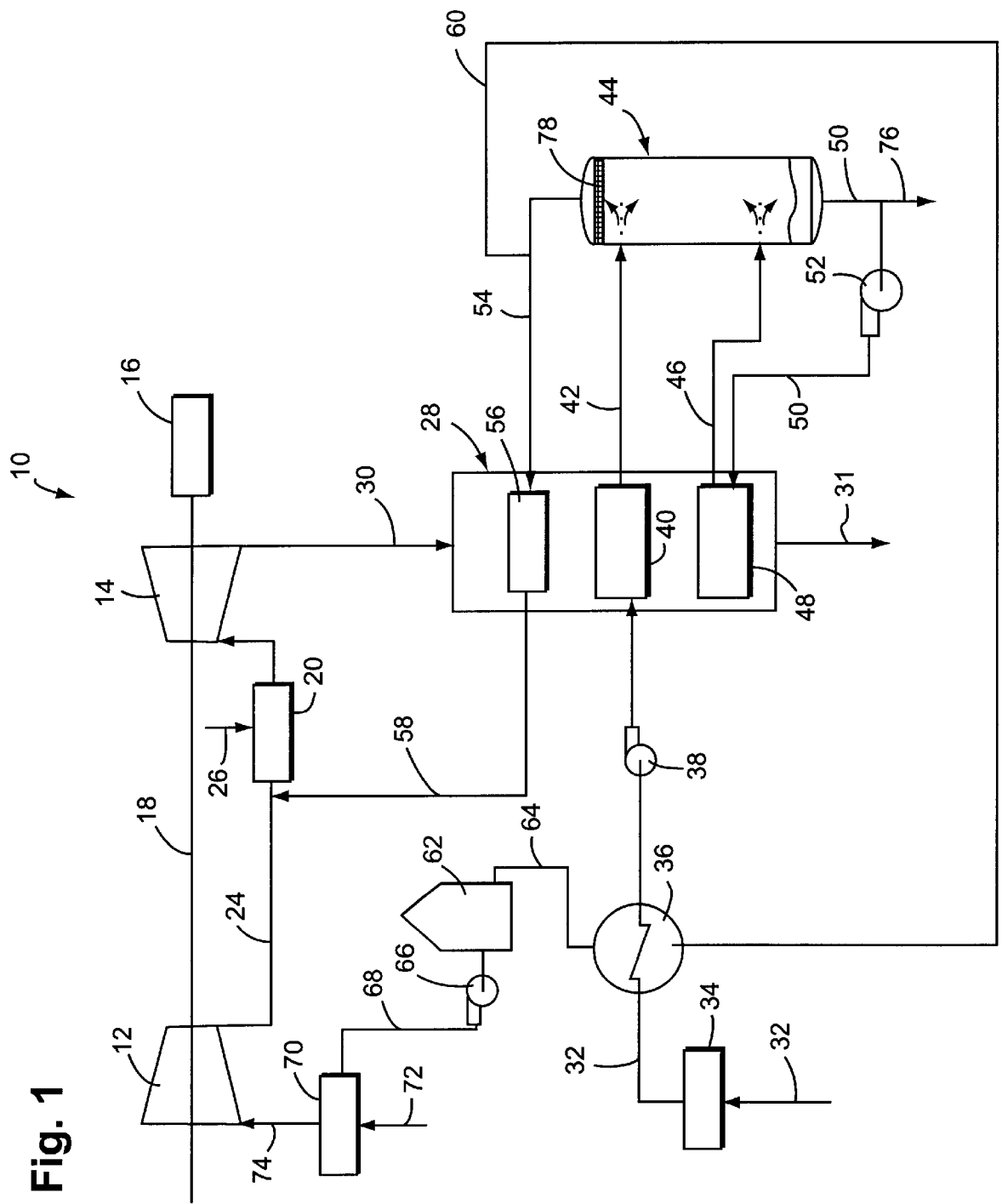

With reference to the FIGURE, a gas turbine plant 10 includes a compressor 12, a turbine component 14 and a generator 16 arranged on a single shaft or rotor 18. It will be understood, however, that the invention is also applicable to multi-shaft configurations.

The compressor 12 supplies compressed air to the turbine combustor 20 via stream 24 that mixes with fuel supplied to the combustor via stream 26. It should be appreciated at the outset that any reference to a "stream" is intended to include steam or water as indicated, as well as the pipe or conduit through which the steam or water travels.

Gas turbine exhaust is introduced into a heat waste recovery unit 28 via stream 30, and is subsequently exhausted to atmosphere via stream 31. Potable water is supplied to the waste heat recovery unit 28 via stream 32, water softener 34 (if necessary), heat exchanger 36 (described further below), and makeup pump 38. This water, also referred to as "makeup water," is supplied to a first heat recovery section 40 of the unit 28. By heat exchange with the turbine exhaust, a first, heated makeup water stream 42 is produced for supply to a flash tank 44 that incorporates a dearator. The operating pressure of the makeup water stream 42 is selected so that the stream leaving the waste heat recovery unit 28 will have adequate subcool to prevent any evaporation in the heat recovery section 40 of the unit 28. A second stream 46 of heated water from a second heat recovery section 48 of the unit 28 is also supplied to the flash tank 44, the water having been supplied to the flash tank as described further below.

The hot water streams 42 and 46 are flashed at high pressure to the lower operating pressure of the flash tank 44, resulting in the production of steam and water. Note that the water remaining after the first makeup water stream 42 is flashed to the flash tank 44 is dearated with the steam produced by the second stream 46, that is also dearated in a dearating section of the flash tank. Saturator bottoms water thus leaves the flash tank/dearator 44 in a dearated condition via stream 50. This water is raised to a higher pressure via pump 52 and then introduced into the second heat recovery section 48 of waste heat recovery unit 28 where it is heated by the gas turbine exhaust to thereby generate the heated water for the second stream 46.

A majority of the saturated steam produced in the flash tank/dearator 44 is supplied via stream 54 to a third heat exchange section 56 in the waste heat recovery unit 28 where it is heated by the gas turbine exhaust, and subsequently supplied via stream 58 to the stream 24, just upstream of the combustor 20. The combined streams are injected into the combustor 20 in conventional fashion.

The remaining smaller portion of the saturated steam from the flash tank 44 is extracted from stream 54 and supplied via stream 60 the to the heat exchanger 36 where it is condensed by heat exchange with the makeup water in stream 32. The resulting water is supplied to a fogger water inlet tank 62 via stream 64. The water is subsequently supplied via pump 66 and stream 68 to a fogger 70. Here, fogger water mixes with air introduced via stream 72 and the mixture is thereafter introduced into the compressor 12 via stream 74, again in conventional fashion.

Maintaining proper contaminant concentration in the flash tank liquid is important to limit the dissolved salts carryover (in the entrained liquid) in the streams 54 and 60 that are used for both steam injection and inlet fogging. Excess amounts of dissolved salts result in severe corrosion of gas turbine components. The contaminant concentration of the flash tank bottoms recirculation liquid is controlled by the blowdown stream 76. In this regard, it will be appreciated that the water in the flash tank 44, absent contamination control, would continually worsen due to the fact that during vapor/liquid separation, the contaminants tend to remain in the water. The blowdown stream 76 is utilized to remove and thus control the contaminant level in the tank, and hence the contaminant level in stream 50 which recycles to the flash tank/dearator via stream 46. Water lost via the blowdown stream is replaced by the potable makeup water in stream 42. In addition, a high efficiency mist eliminator 78 is located at the top of the flash tank 44 to minimize liquid carryover which is the source of salts in the steam 54.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine power plant that includes a compressor, a combustor and a turbine, and that includes compressor inlet fogging and combustor steam injection, an arrangement for supplying water for inlet fogging and steam injection without demineralization treatment comprising a flash tank arranged to receive heated potable water and to separate the heated potable water into saturated steam and water; a blowdown stream for controlling contaminants in the water within the flash tank; one or more conduits arranged to supply a first portion of the saturated steam in the flash tank to the combustor; one or more conduits arranged to supply a second portion of the saturated steam to a heat exchanger where the saturated steam is condensed; and one or more conduits for supplying condensed saturated steam to an inlet fogger in fluid communication with the compressor.

2. The gas turbine power plant of claim 1 and further comprising a waste heat recovery unit to which exhaust gas from the turbine is supplied, said waste heat recovery unit having a plurality of heat exchange sections therein, and wherein the potable water is heated in a first of said heat exchange sections and supplied to said flash tank via a first stream.

3. The gas turbine power plant of claim 2 wherein a portion of the water drained from said flash tank is supplied to a second of said heat exchange sections of said waste heat recovery unit and returned to said flash tank via a second stream.

4. The gas turbine power plant of claim 1 wherein said heat exchanger is arranged to pass said potable water in heat exchange relationship with said second portion of said saturated steam.

5. The gas turbine power plant of claim 1 wherein said first portion of said saturated steam is heated in a third of said heat exchange sections in said waste heat recovery unit upstream of said combustor.

6. A steam injection and inlet fogging system for a gas turbine power plant comprising:
   a gas turbine having a compressor, a combustor and a turbine for driving a generator;
   a waste heat recovery unit arranged to receive exhaust gas from said turbine, said waste heat recovery unit having a plurality of heat exchange sections for heating water with said exhaust gas;
   a flash tank for producing steam arranged to receive heated water from said waste heat recovery unit;
   means for supplying a first stream of water from a first of said plurality of heat exchange sections to said flash tank to thereby produce saturated steam and water at a first location in said flash tank;
   means for supplying a second stream of water from a second of said plurality of heat exchange sections to said flash tank to thereby produce saturated steam and water at a second location in said flash tank;
   means for supplying a portion of the saturated steam produced in said flash tank to the gas turbine combustor; means for supplying a remaining portion of the saturated steam to the compressor via an inlet fogger; and means for controlling contaminants in the water produced in the flash tank.

7. The steam injection and inlet fogging system of claim 6 wherein said first stream of water comprises makeup water supplied to said first heat exchange section from an external source.

8. The steam injection and inlet fogging system of claim 6 wherein said second stream of water comprises water drained from said flash tank/dearator and returned to a second heat exchange section of said waste heat recovery unit.

9. The steam injection and inlet fogging system of claim 6 wherein said portion of the saturated steam supplied to the gas turbine combustor is first passed through a third of said plurality of heat exchange sections located in said waste heat recovery unit.

10. The steam injection and inlet fogging system of claim 6 wherein said remaining portion of the saturated steam supplied to the inlet fogger is first passed through a heat exchanger in heat exchange relationship with the makeup-water upstream of the waste heat recovery unit to thereby condense said remaining portion of the saturated stream prior to introduction into said inlet fogger.

11. The steam injection and inlet fogging system of claim 6 wherein said flash tank is provided with a mist eliminator to minimize liquid carryover in the saturated steam.

12. A method of providing steam for a steam injection and inlet fogging system for a gas turbine power plant that includes a gas turbine having a compressor, a combustor and a turbine for driving a generator, and without having to provide a demineralization treatment for water used to generate the steam comprising:

a) supplying heated makeup water in a first stream to a flash tank for producing saturated steam and water;

b) draining water from the flash tank while removing contaminants therefrom and, after heating, recirculating a portion of the drained water to the flash tank in a second stream;

c) removing saturated steam from said flash tank and supplying a portion of the saturated steam to the combustor and another portion of the saturated steam to the compressor via an inlet fogger.

13. The method of claim 12 wherein the first and second streams are heated by exhaust gas from the turbine prior to entry into the flash tank.

14. The method of claim 12 wherein a blowdown stream is used to control the contaminants in the water drained from the flash tank.

15. The method of claim 12 including, during step c), heating said portion of the saturated steam downstream of said flash tank.

16. The method of claim 12 including, during step c), said another hi portion of the saturated steam is condensed upstream of the inlet fogger.

17. The method of claim 12 wherein said another portion of the saturated steam is condensed by passing said another portion of the saturated steam in heat exchange relationship with the makeup water.

18. The method of claim 12 including, in steps a) and b), heating said first and second streams via exhaust gas from said turbine.

\* \* \* \* \*

UNITED STATES PATENT AND TRADEMARK OFFICE
CERTIFICATE OF CORRECTION

PATENT NO. : 6,446,440 B1
DATED : September 10, 2002
INVENTOR(S) : Ranasinghe et al.

It is certified that error appears in the above-identified patent and that said Letters Patent is hereby corrected as shown below:

<u>Column 6,</u>
Line 22, delete "hi."

Signed and Sealed this

Eleventh Day of February, 2003

JAMES E. ROGAN
*Director of the United States Patent and Trademark Office*